(12) United States Patent
Venable et al.

(10) Patent No.: US 8,714,597 B2
(45) Date of Patent: May 6, 2014

(54) WELDED JOINT FOR LINED PIPE AND COMPONENTS THEREOF

(75) Inventors: Matthew Venable, Durango, CO (US); Randall Egner, Durango, CO (US)

(73) Assignee: United Pipeline Systems, Inc., Chesterfield, MO (US)

( * ) Notice: Subject to any disclaimer, the term of this patent is extended or adjusted under 35 U.S.C. 154(b) by 277 days.

(21) Appl. No.: 12/681,883

(22) PCT Filed: Oct. 1, 2008

(86) PCT No.: PCT/US2008/078365
§ 371 (c)(1),
(2), (4) Date: Apr. 6, 2010

(87) PCT Pub. No.: WO2009/048772
PCT Pub. Date: Apr. 16, 2009

(65) Prior Publication Data
US 2010/0207380 A1    Aug. 19, 2010

Related U.S. Application Data

(60) Provisional application No. 60/978,177, filed on Oct. 8, 2007.

(51) Int. Cl.
*F16L 55/00*    (2006.01)
(52) U.S. Cl.
USPC .......... 285/45; 285/55; 285/293.1; 285/288.6
(58) Field of Classification Search
USPC ............ 285/55, 45, 46, 293.1, 238, 239, 255, 285/258, 286.1, 286.2, 288.5, 288.6; 138/147, 148, 148.13
See application file for complete search history.

(56) References Cited

U.S. PATENT DOCUMENTS

| | | | | |
|---|---|---|---|---|
| 2,785,459 A | * | 3/1957 | Carpenter | 228/136 |
| 2,896,789 A | * | 7/1959 | Salvatore et al. | 108/28 |
| 2,966,340 A | * | 12/1960 | Chapman | 285/141.1 |
| 3,228,096 A | | 1/1966 | Albro | |
| 3,298,716 A | * | 1/1967 | Taylor et al. | 285/55 |
| 3,534,988 A | * | 10/1970 | Lindsey | 285/305 |
| 3,596,931 A | | 8/1971 | Mishler | |
| 3,656,783 A | * | 4/1972 | Reeder | 285/239 |
| 3,920,270 A | | 11/1975 | Babb, Jr. | |
| 4,083,583 A | * | 4/1978 | Volgstadt et al. | 285/55 |
| 4,277,091 A | * | 7/1981 | Hunter | 285/55 |
| 4,293,150 A | * | 10/1981 | Press | 285/222.4 |

(Continued)

OTHER PUBLICATIONS

Written Opinion in related International Application No. PCT/US2008/078365 dated Dec. 3, 2008, consisting of 4 pages.

(Continued)

*Primary Examiner* — James Hewitt
*Assistant Examiner* — Jay R Ripley
(74) *Attorney, Agent, or Firm* — Senniger Powers LLP

(57) ABSTRACT

A welded joint of a lined pipeline has a main pipe and an extension piece having a generally tubular shape, an inner wall and an annular weld connecting the extension piece to the main pipe. A liner extends through the main pipe and partially into the extension piece. A compression ring includes a flange and a compression portion. The compression portion engages the liner internally and compresses the liner radially outwardly against the extension piece so that the liner is sealed with the compression ring.

9 Claims, 14 Drawing Sheets

(56) References Cited

U.S. PATENT DOCUMENTS

| | | | |
|---|---|---|---|
| 4,482,170 A * | 11/1984 | Jacobson et al. | 285/55 |
| 5,221,114 A * | 6/1993 | Parker | 285/255 |
| 5,244,237 A | 9/1993 | Harvey | |
| 5,326,137 A * | 7/1994 | Lorenz et al. | 285/55 |
| 5,348,211 A | 9/1994 | White et al. | |
| 5,642,595 A * | 7/1997 | Daniels et al. | 52/301 |
| 5,984,377 A * | 11/1999 | Struthers et al. | 285/258 |
| 5,992,897 A * | 11/1999 | Hill et al. | 285/55 |
| 2003/0047939 A1 * | 3/2003 | Whitehead et al. | 285/55 |
| 2009/0129853 A1 | 5/2009 | Pionetti | |

OTHER PUBLICATIONS

International Search Report in International Application No. PCT/US2008/078365 dated Dec. 3, 2008, consisting of 1 page.

* cited by examiner

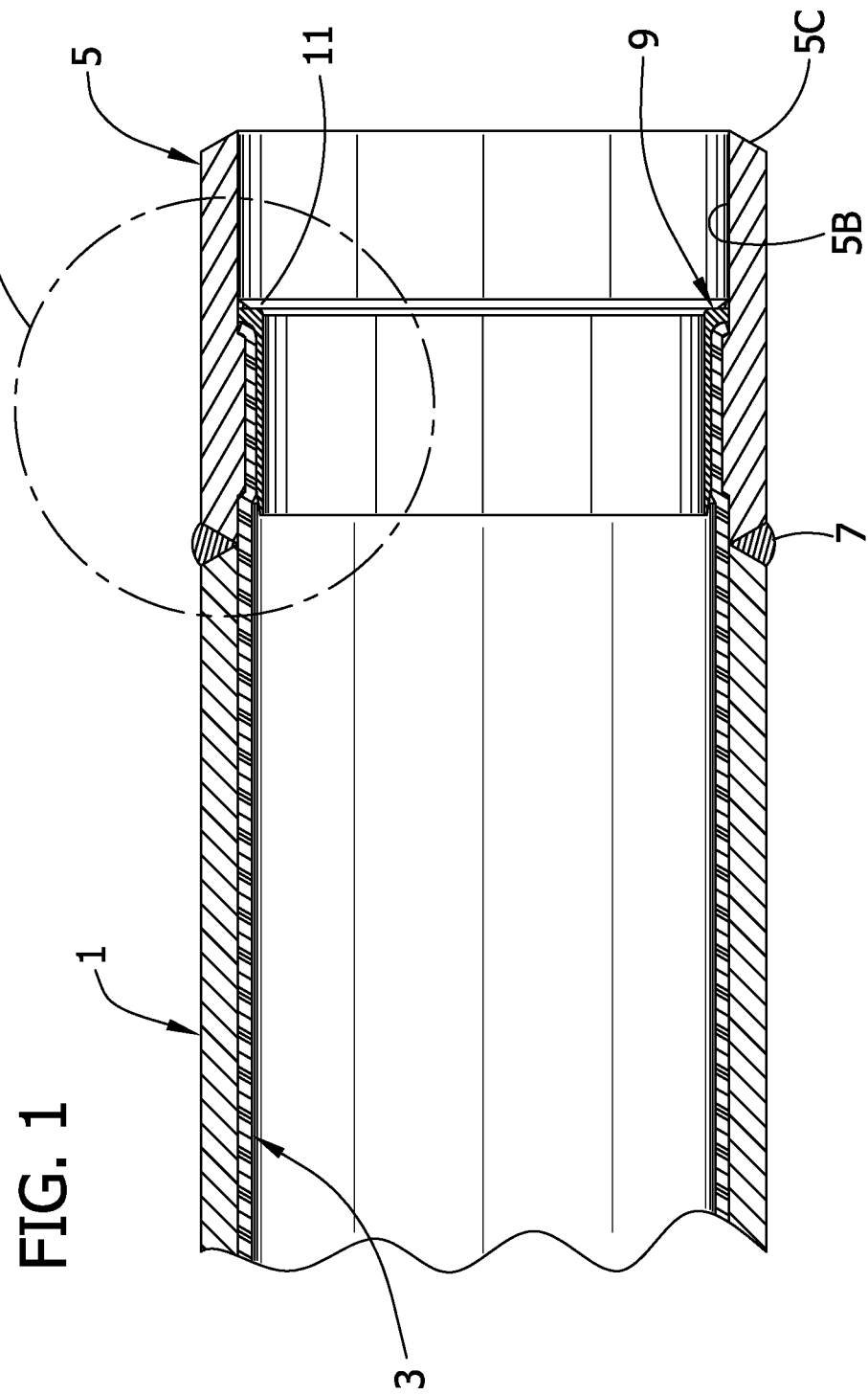

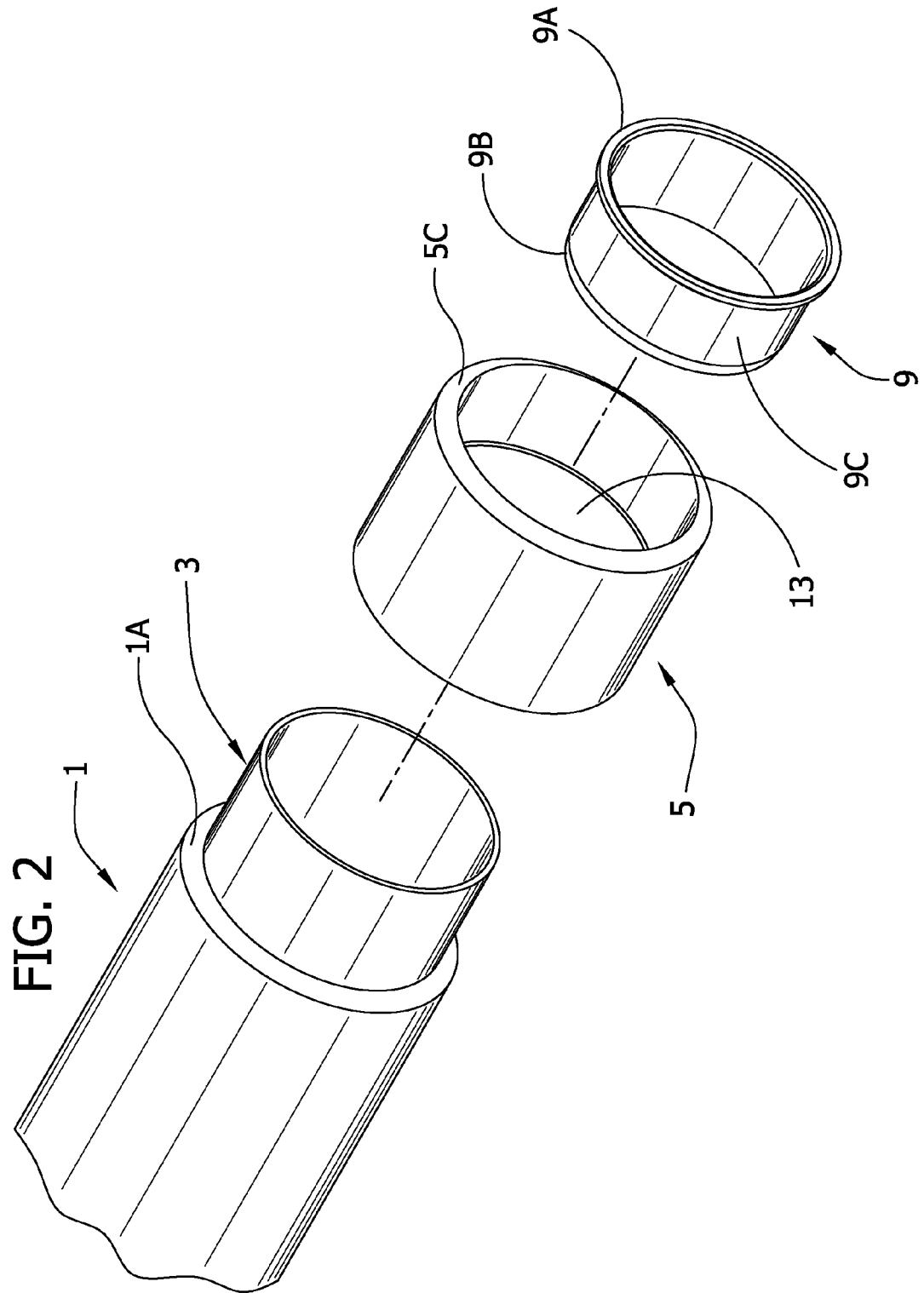

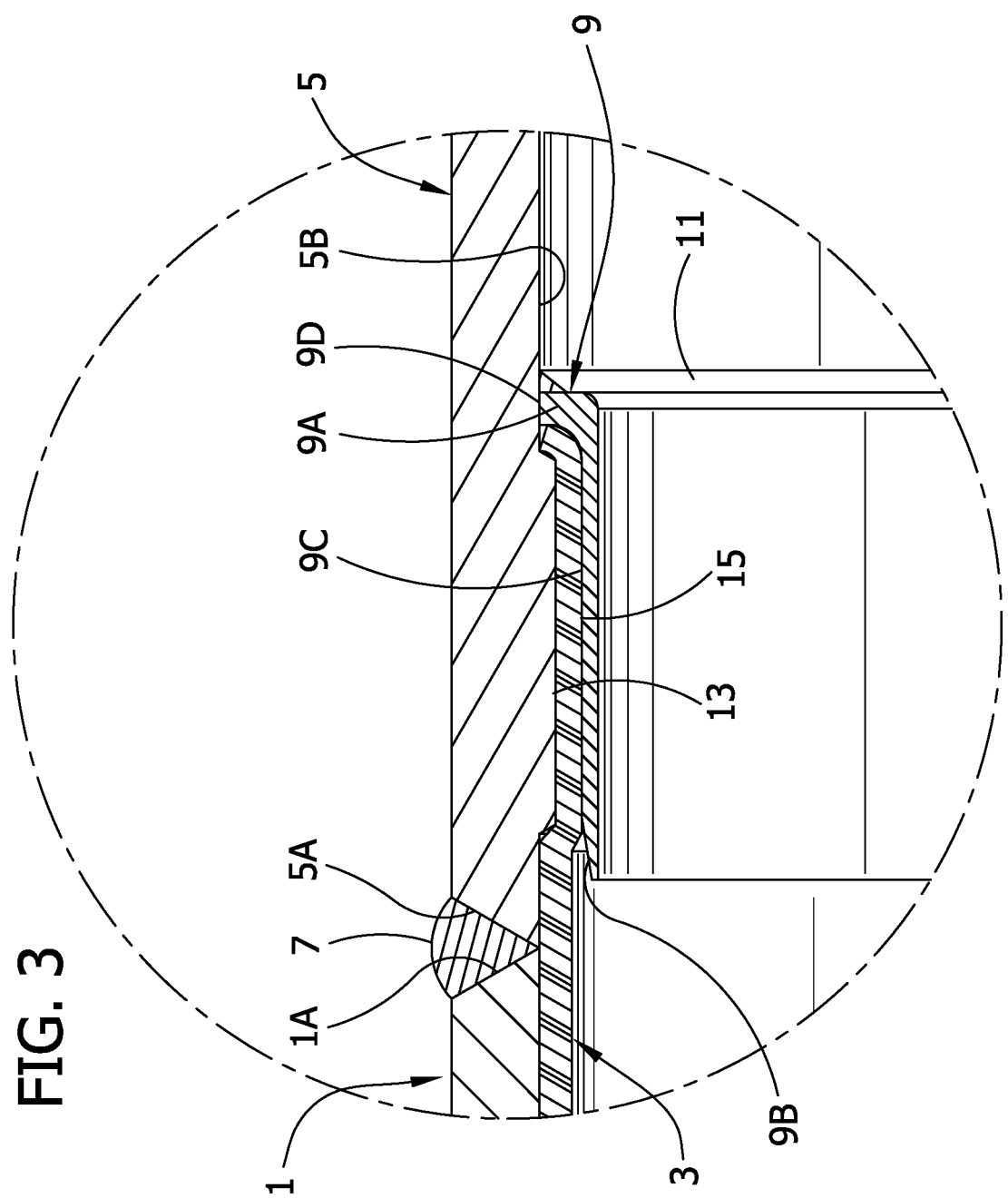

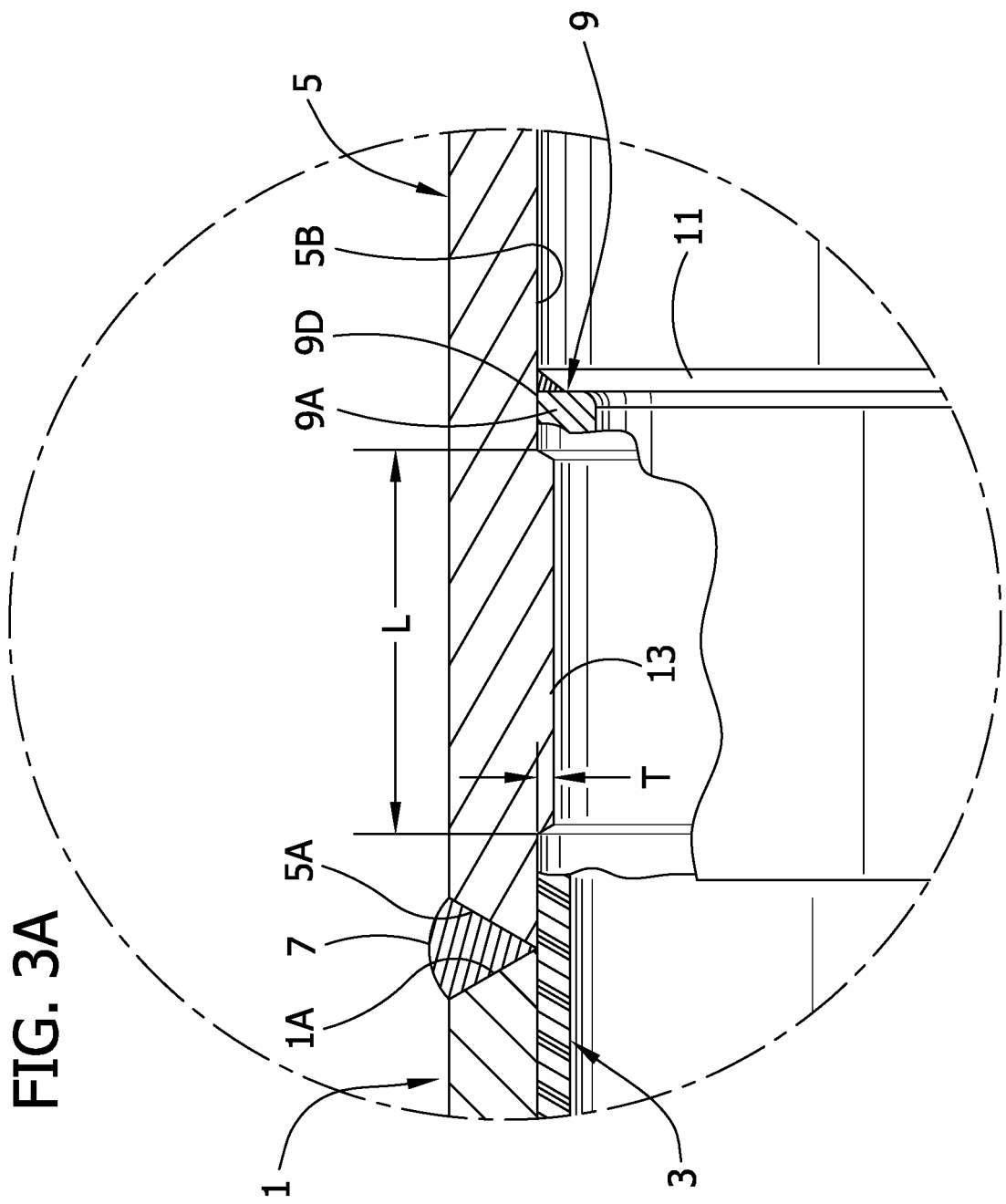

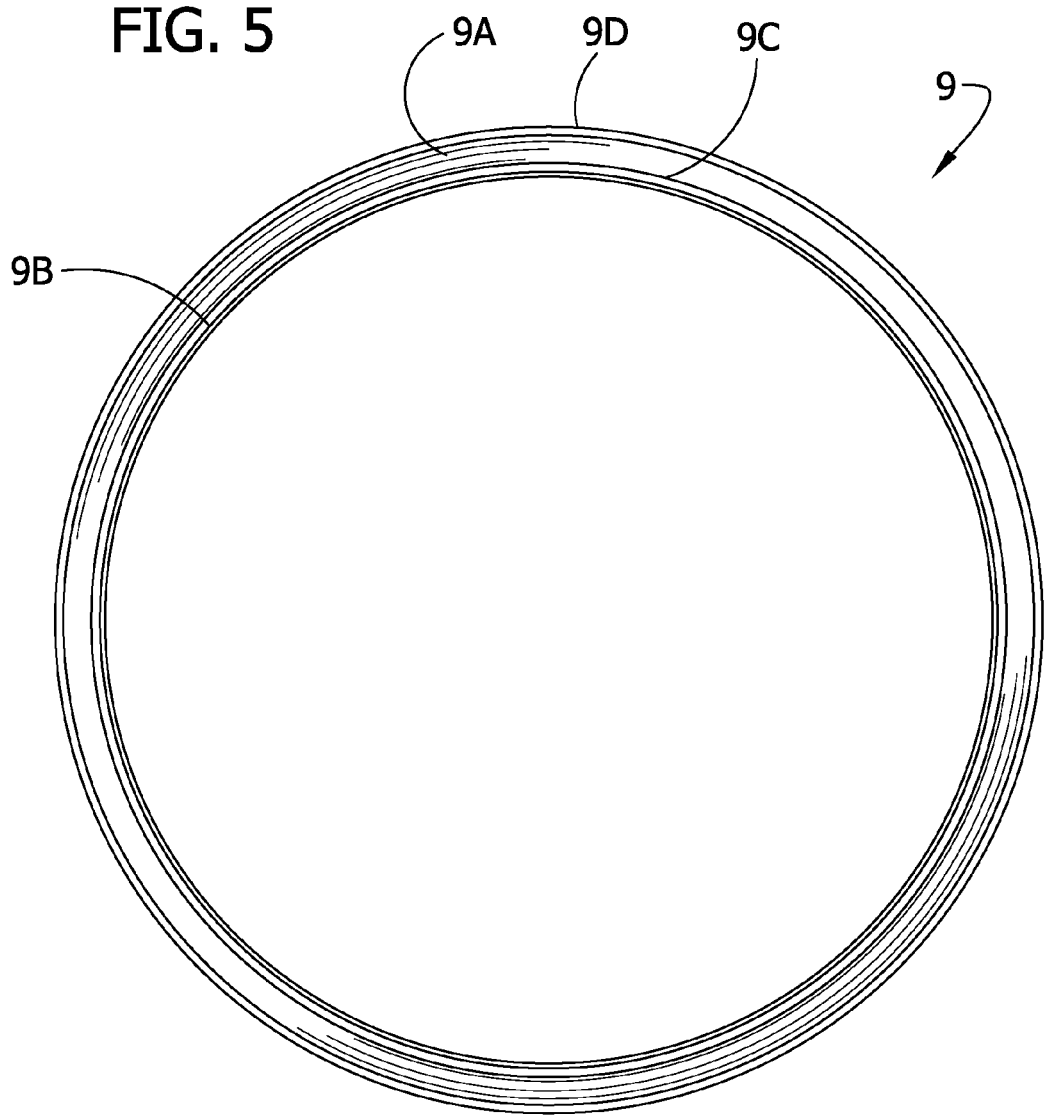

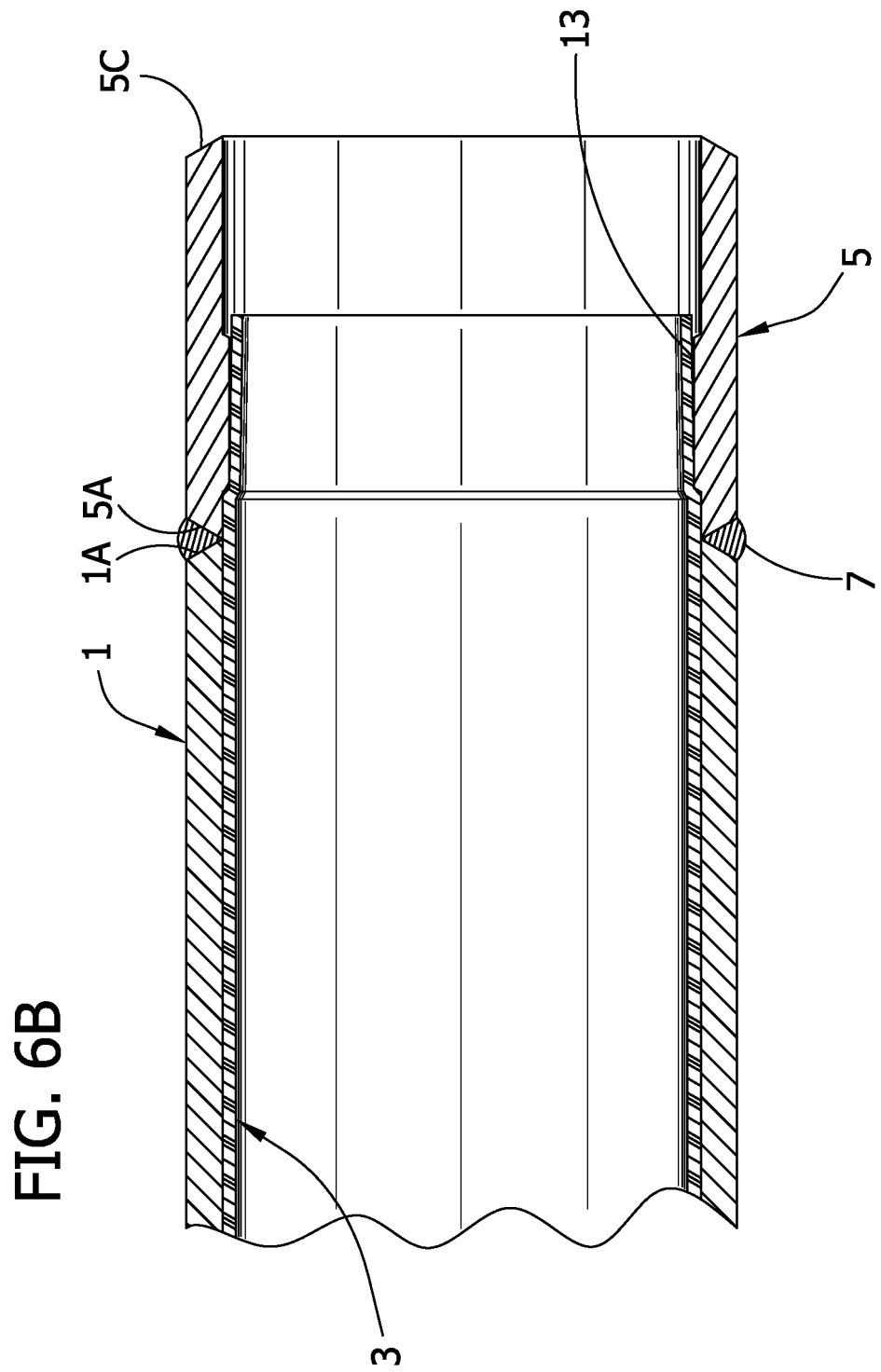

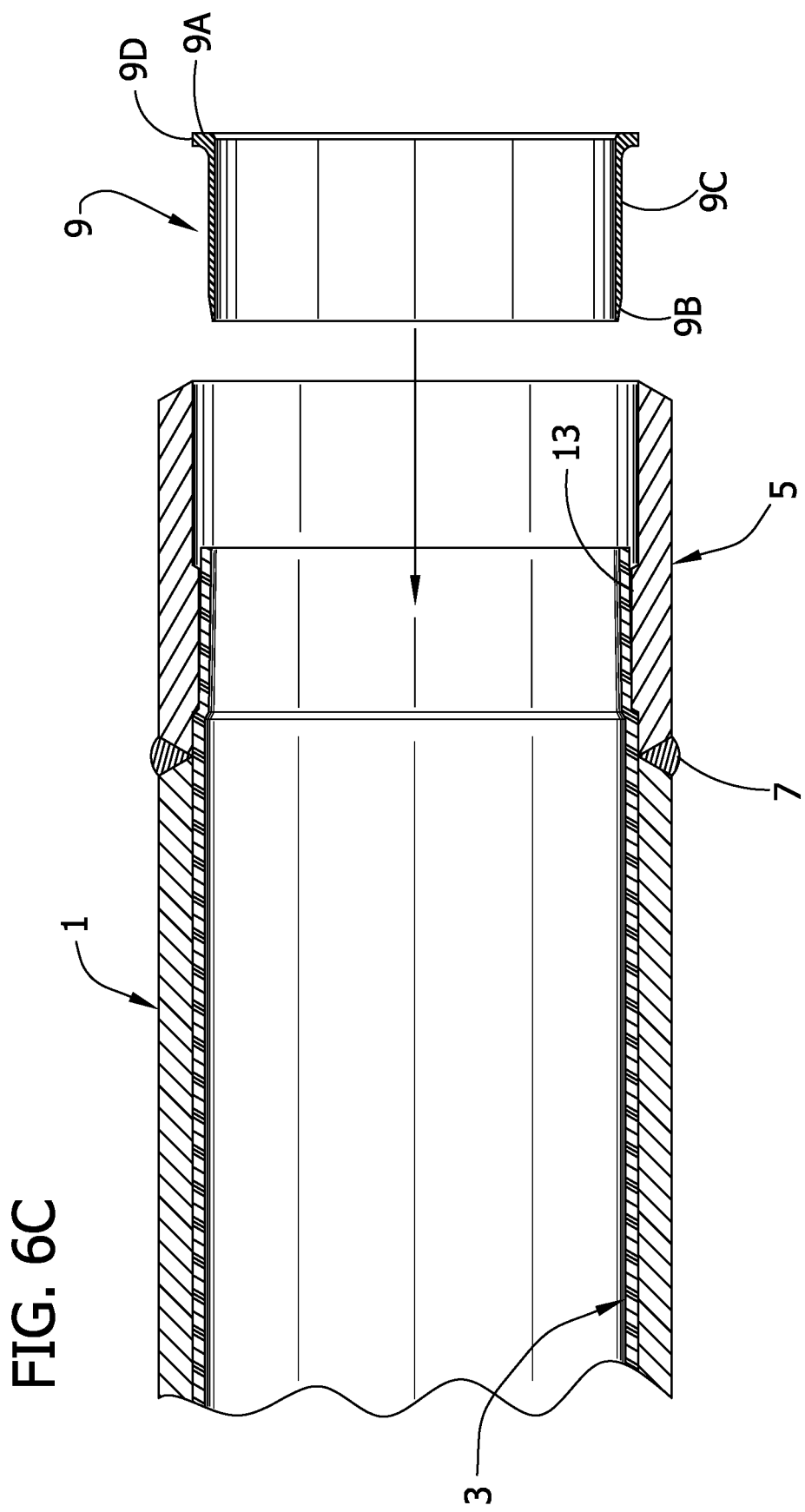

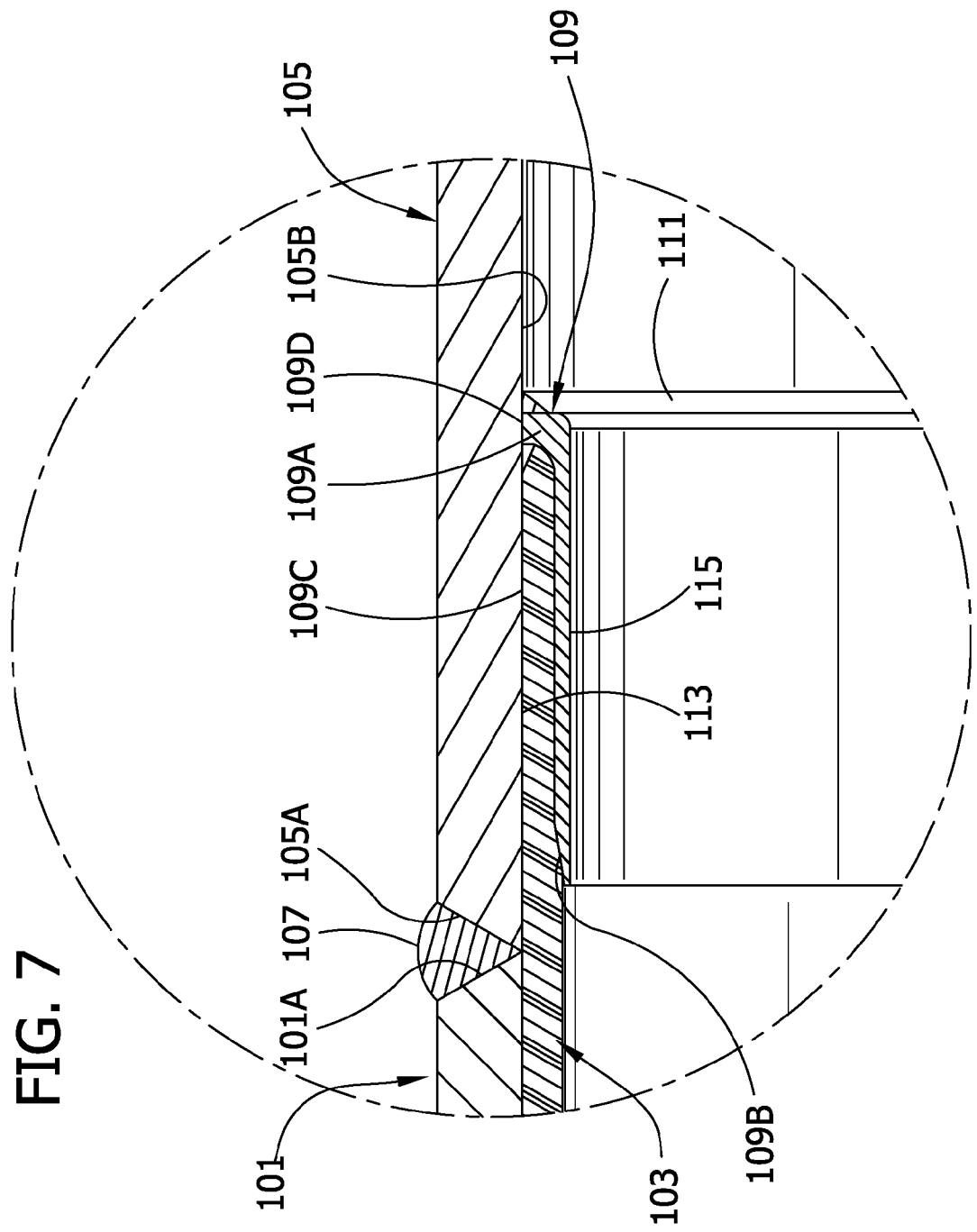

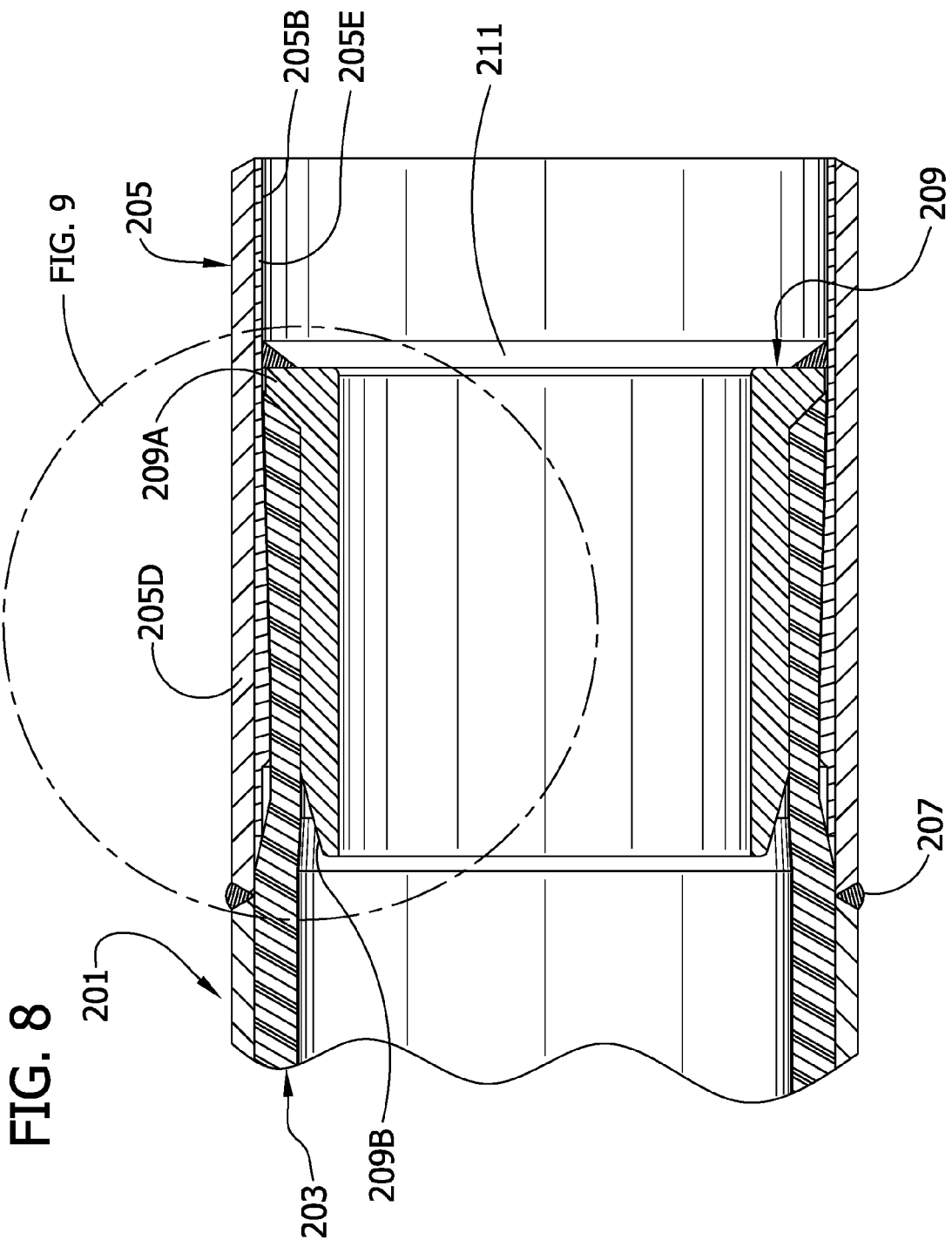

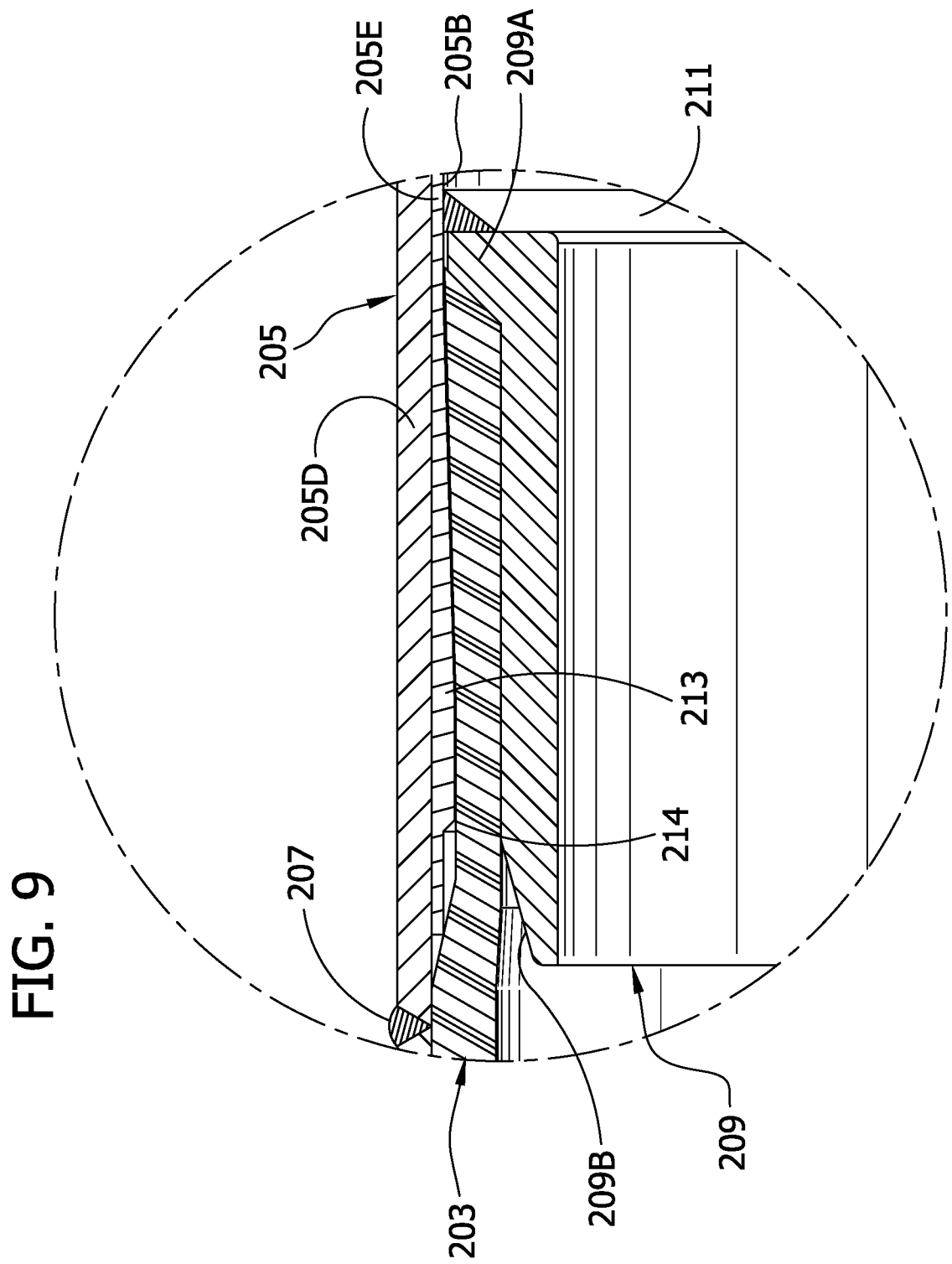

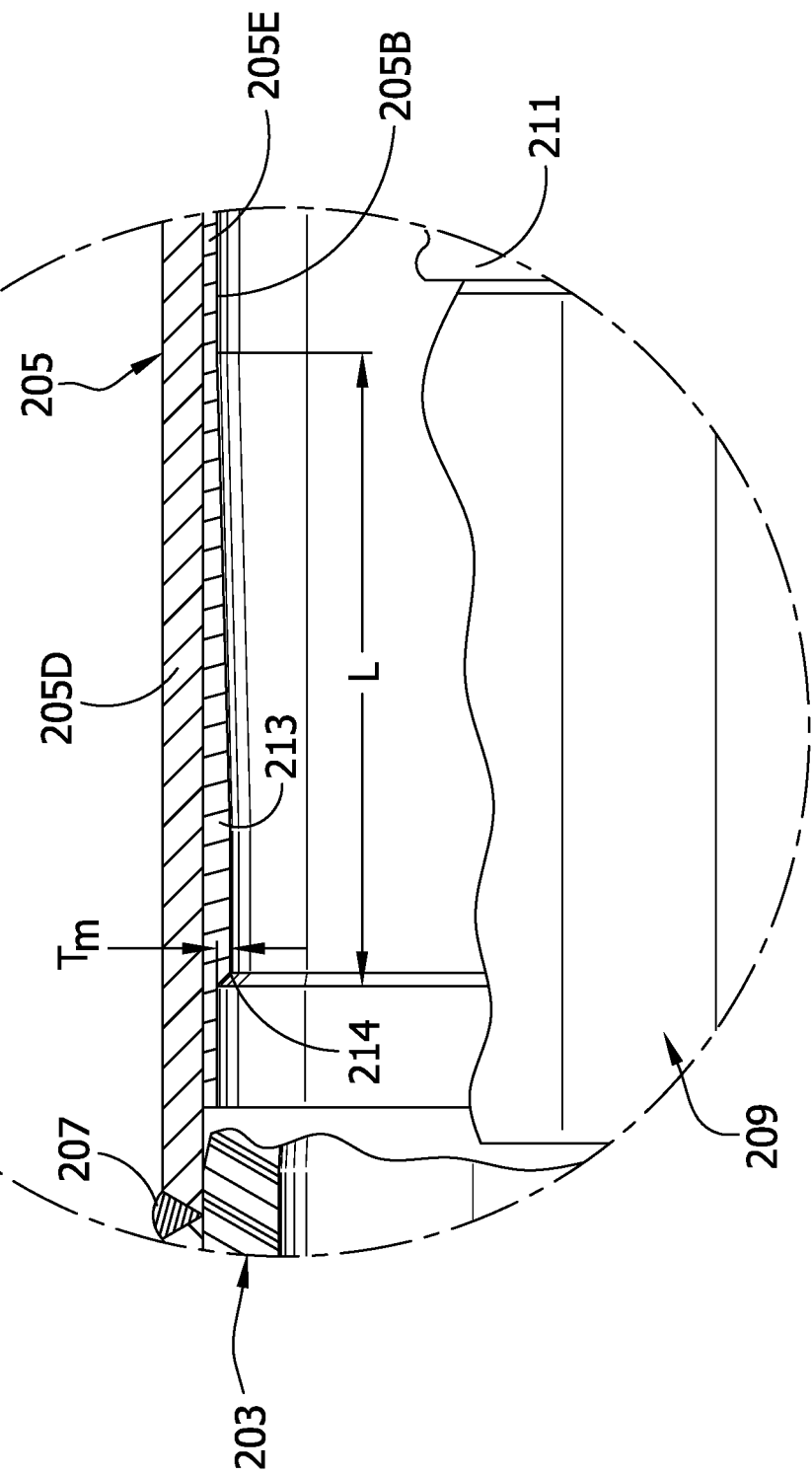

WELDED JOINT FOR LINED PIPE AND COMPONENTS THEREOF

BACKGROUND OF THE INVENTION

This invention relates generally to welded pipe joints and more particularly to a welded joint for a pipeline including a liner.

In today's world of pipelines it is becoming more and more popular to rehabilitate pipelines than to replace them. One form of pipeline rehabilitation involves relining the host pipe with a high density polyethylene liner. High density polyethylene (HDPE) pipe is a relatively inexpensive pipe and resists material erosion, corrosion and, abrasion while being relatively chemically inert. One common method of installing a HDPE liner is to pass the liner through a series of downsizing roller boxes, each comprising series of concave rollers set about the parameter of the liner. Each set of rollers has a smaller lumen than the one before it. As the HDPE liner is pulled or pushed through the series of roller boxes the rollers exert an external force on the liner about the parameter of the liner. HDPE has the capability of elastic deformation that allows the liner to actually compress in the circumferential dimension. The reduction can be as much as 8% to 12% or possibly even greater (e.g., up to about 25%). This allows the HDPE liner to have an outside diameter 1% to 5% greater than the inside diameter of the host pipe. After passing through the diameter reduction roller boxes the liner has a diameter in the neighborhood of 5% less than the inside diameter of the host. This allows the HDPE liner to be pulled through the host pipe. After the HDPE liner is pulled through, the ends are cut off and with the release of tension the liner returns to near its original diameter and causes tight fit within the host pipe.

After the HDPE has been installed, the ends of the liner and the host pipe must be returned to service by reestablishing the connections at either end of the pipeline. Ways to do this with flange ends have been accomplished by various companies with varying degrees of success, complexity and difficulty. Many pipe lines however are not conducive to using flange ends or spool pieces to reconnect the lined section of the pipe to the pipeline. Many systems owners require a monolithic pipeline which requires welded joints in the pipe line. The instant invention solves the problems associated with this type of joint reconnection. However it can also be used in a flange joining type pipeline system by merely welding a flange on to the described termination end seal below.

Other attempts to provide a welded joint for a lined pipe generally involve the use of numerous components. This is primarily because it is important to assure that a terminal end of the liner be sealed with the pipe so as to prevent ingress of fluid between the liner and the pipe. Pipe liner that is inserted into an existing pipe over significant distances will be subject to significant scarring on the outer surface of the liner because of sliding engagement with the inner wall of the pipe. The scars form paths or channels for ingress of fluid, particularly at the terminal end of the liner. Thus, even if the liner is compressed tightly against the inner wall of the pipe, the channels left by the scarring may well permit fluid to enter between the liner and the inner pipe wall.

SUMMARY OF THE INVENTION

In one aspect of the present invention, a welded pipeline joint of a lined pipeline generally comprises a main pipe, an extension piece having a generally tubular shape and an inner wall and an annular weld connecting the extension piece to the main pipe. A liner extends through the main pipe and partially into the extension piece. A compression ring includes a flange and a compression portion. The compression portion engages the liner internally and compresses the liner radially outwardly against the extension piece so that the liner is sealed with the compression portion. The flange of the compression ring is sealed with the inner wall of the extension piece thereby to prevent ingress of fluid between the flange and the inner wall.

In another aspect of the present invention, a method of joining a main pipe to an extension piece generally comprises the step of providing a main pipe and extension piece that are connected together for fluid communication through the main pipe and extension piece. The connected main pipe and extension piece include a liner lining an inner wall of the main pipe and a portion of an inner wall of the extension piece. A compression ring is placed into an open end of the extension piece opposite the main pipe. The compression ring guides the liner in to a position between the compression ring and the inner wall of the extension piece thereby to compress the liner against the inner wall of the extension piece for sealing with the extension piece and the compression ring. The compression ring is sealed with the inner wall of the extension piece.

In yet another aspect of the present invention, an extension piece for welded connection with a main pipe, the extension piece generally comprises a tube having an inner wall and at least one open end adapted for welded connection to a main pipe. A single annular sealing shelf projects radially inwardly from the inner wall of the tube. The sealing shelf is spaced radially inwardly of the inner wall of the extension piece and extends axially along the inner wall.

In a further aspect of the present invention, a compression ring for use in sealing an end of a tubular liner in a pipe with the pipe generally comprises a tube and a radially outwardly projecting flange at one end of the tube. A tapered portion of the compression ring tapers radially inwardly at an end of the compression ring opposite the flange is capable of wedging a liner in the pipe to a location between the compression ring and the liner.

Other objects and features of the present invention will be in part apparent and in part pointed out hereinafter.

BRIEF DESCRIPTION OF THE DRAWINGS

FIG. 1 is a fragmentary section of a welded joint for a lined pipe;

FIG. 2 is a fragmentary exploded perspective of the joint;

FIG. 3 is an enlarged portion of the section of FIG. 1 as indicated in FIG. 1;

FIG. 3A is the enlarged section of FIG. 3, but with parts broken away for clarity of illustration;

FIG. 5 is a left end elevation of the compression ring;

FIGS. 6A-6D illustrate a process for forming the weld joint;

FIG. 7 is an enlarged section similar to FIG. 3, but showing another embodiment; and FIG. 8 is a fragmentary of a welded joint for a lined pipe of another embodiment;

FIG. 9 is the enlarged portion of the section of FIG. 8 as indicated in FIG. 8;

FIG. 9A is the enlarged section of FIG. 9, but with parts broken away to clarity of illustration.

Corresponding reference characters indicate corresponding parts throughout the several views of the drawings.

DETAILED DESCRIPTION

Figure 4:
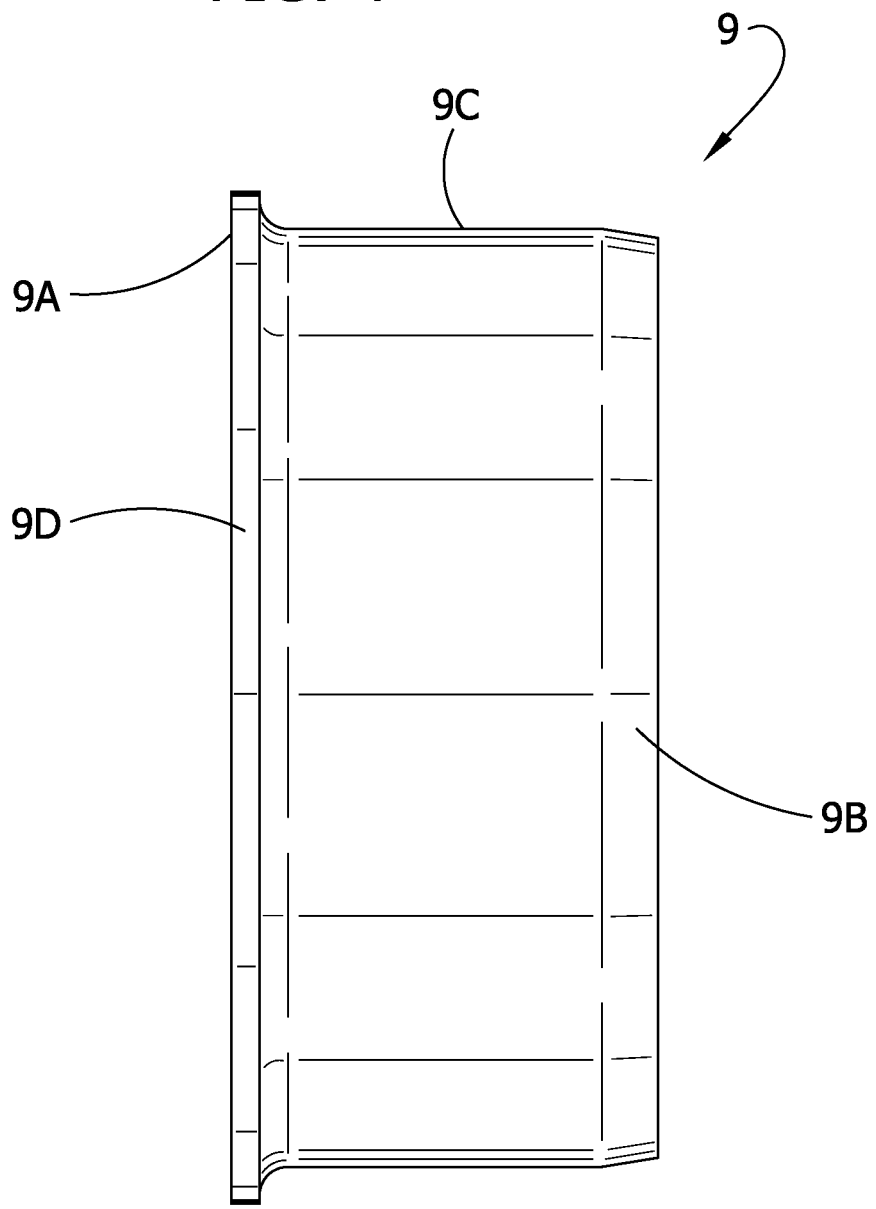
FIG. 4 is a side elevation of a compression ring of the welded joint.

Referring now the drawings and in particular to FIG. 1, a welded joint according to one embodiment of the present invention is shown to comprise a main pipe 1 and a liner 3 (the reference numbers designating their subjects generally). The main pipe 1 is shown in the illustrated embodiment as being made of metal (e.g., carbon steel), but can be made of any suitable material. The main pipe 1 may be part of or constitute the entirety of a pipeline. The liner 3 is made of a material that is suitable for the application, which may be (for example) of an erosive, corrosive or abrasive fluid that can damage the unlined main pipe 1 over time. In the illustrated example, the liner 3 is made of high density polyethylene (HDPE). The welded joint further includes an extension piece (generally indicated at 5) that is joined to the main pipe 1 by a first annular weld 7. The adjoining end faces (1A, 5A) of the main pipe 1 and extension piece 5 are beveled to receive the weld (see, FIG. 3). The welded joint includes a compression ring indicated generally at 9 inside the extension piece 5 and sealing the end of the liner 3 with the extension piece to prevent ingress of liquid or fluid between the liner and the main pipe 1 or extension piece. A second annular weld 11 joins the compression ring 9 to the interior of the extension piece 5 and seals the compression ring with the extension piece. It will be understood that the welded joint may have a greater or lesser number of parts within the scope of the present invention.

Referring now also to FIGS. 2, 3 and 3A, the extension piece 5 is made of a suitable material, and in one embodiment is made of a steel alloy particularly selected to resist erosion, corrosion, abrasion or the like from the liquid or gas transported through the extension piece. Examples of such an alloy include without limitation, stainless 304, Inconel 625 and stainless 316. The extension piece 5 is tubular in shape and has an annular sealing shelf 13 projecting inwardly a distance or thickness T for use in establishing a seal with the liner 3 as will be described more fully hereinafter. The sealing shelf 13 has a cylindrical, radially inwardly facing surface constituting a majority of its length, and sloped surfaces on either side leading up to the radially inwardly facing surface. The distance T that the sealing shelf 13 projects inward from the inner wall of the extension piece 5 and a length L of the shelf may be selected according to the thickness of the liner 3, the diameter of the main pipe 1 and the pressure of the fluid transported in the pipeline. In one example in which the diameter of the main pipe 1 is about 10 inches (25.4 cm) the thickness of the HDPE liner 3 is about 0.28 inches (0.71 cm), the sealing shelf 13 projects inwardly from an inner wall 5B of the extension piece 5 a projection distance (T) of about 50 to 100 thousandths of an inch (0.13 to 0.25 cm), and has a length L of about 3 inches (7.6 cm). The compression of the liner 3 in the area of the sealing shelf 13 may be, for example, about 20%. Other projection distances T and lengths L of the sealing shelf 13, selected based on other criteria, may be employed within the scope of the present invention. Generally speaking the length of the sealing shelf 13 is preferably at least about one inch (2.54 cm) in length. The pipeline including the main pipe 1 may be of any length, but it will be understood that in some instances the pipeline may be on the order of one mile or more long. The extension piece 5 may serve several functions, including providing a joint for connection of the main pipe 1 (which in the illustrated embodiment is substantially straight) to a bent or curved section of pipe (not shown) that would be difficult to negotiate to install a liner. The extension piece 5 may be used to connect a valve, or still other fluid handling pipes or devices as necessary. Moreover, an extension piece may itself incorporate a valve or be a curved or angled section within the scope of the present invention. An end face 5C of the extension piece 5 opposite the main pipe 1 may also be beveled to facilitate welding to another part (not shown).

With further reference to FIGS. 4 and 5, the compression ring 9 is generally tubular in shape and is made of a steel alloy that will resist the erosive, corrosive, abrasive, etc. nature of the fluid being transported through the welded joint. The compression ring 9 may be made of the same steel alloy as the extension piece 5, or may be made of a different material. The compression ring 9 has a flange 9A at one end a tapered portion 9B at the opposite end. The flange 9A has an outer diameter that is slightly smaller (e.g., on the order of 60 thousandths of an inch or about 0.15 cm) than the interior diameter of the extension piece 5. Thus as received in the extension piece, the flange 9A has close, but sliding fit with the extension piece 5. The flange 9A includes a generally cylindrical, radially outwardly facing surface 9D that may engage the inner wall 5B of the extension piece 5. It is the flange 9A that is secured to the inner wall of the extension piece 5 by the second weld 11 to fix the compression ring 9 in place. The second weld 11 is continuous about the circumference of the flange 9A and forms a seal between the compression ring 9 and the inner wall 5B of the extension piece 5. This seal prevents fluid carried in the pipeline from entering between the compression ring 9 and inner wall 5B of the extension piece, where it could ultimately get between the liner 3 and the inner wall. Other ways of sealing the flange 9A to the inner wall 5B of the extension piece 5 may be used within the scope of the present invention. The tapered portion functions as a ramp to guide the end of the liner 3 between the compression ring 9 and the inner wall of the extension piece 5 to clamp the end of the liner against the inner wall 5B of the extension piece. The liner 3 seals with the compression ring 9 and prevents fluid from entering between the liner and the compression ring where it could then move between the liner and the inner wall 5B of the extension piece 5. The inner wall of the liner 3 is not substantially scarred or damaged by the process of inserting the liner into the main pipe 1 and can form a good seal with the compression ring 9.

Figure 6A:
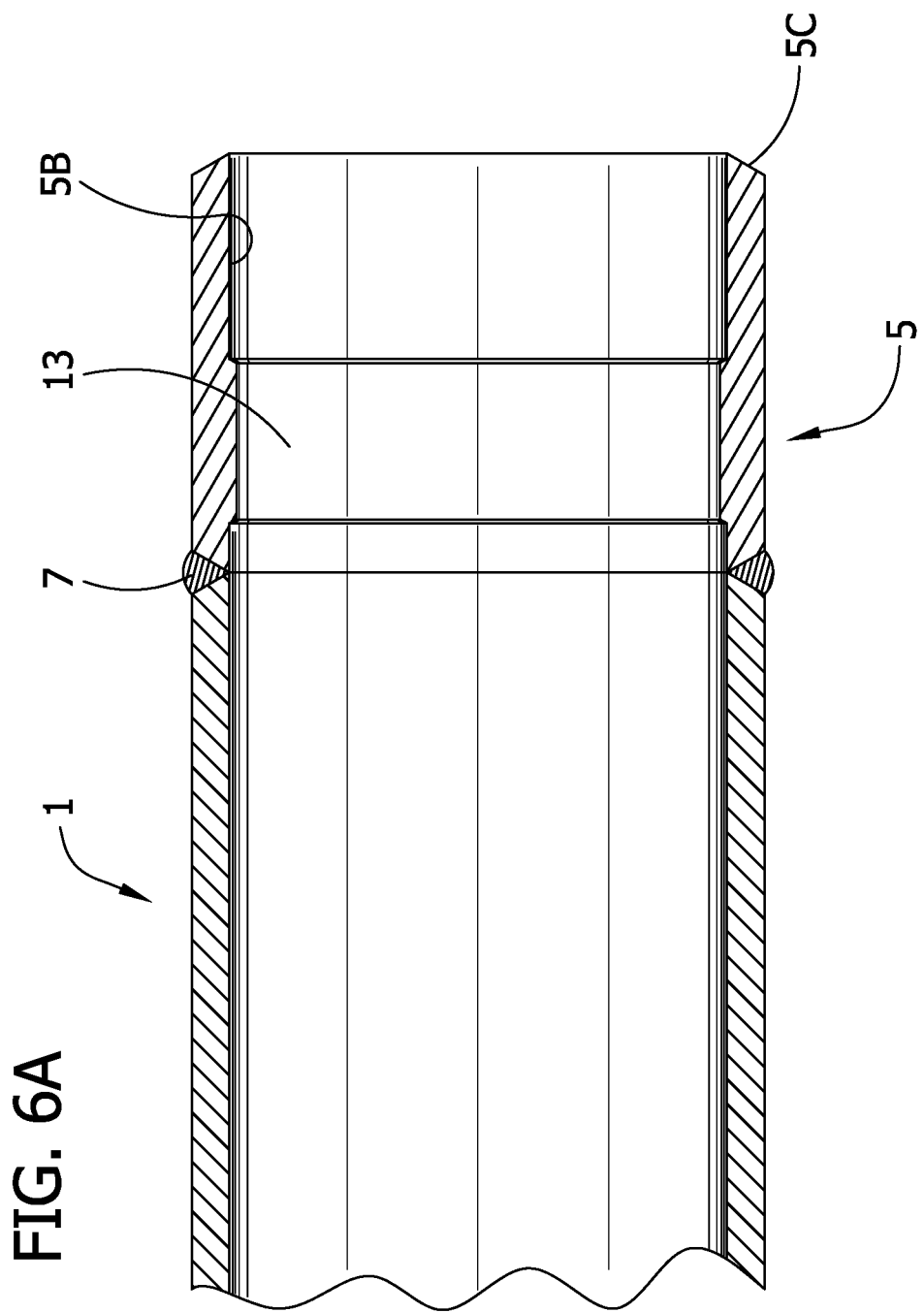
Figure 6D:
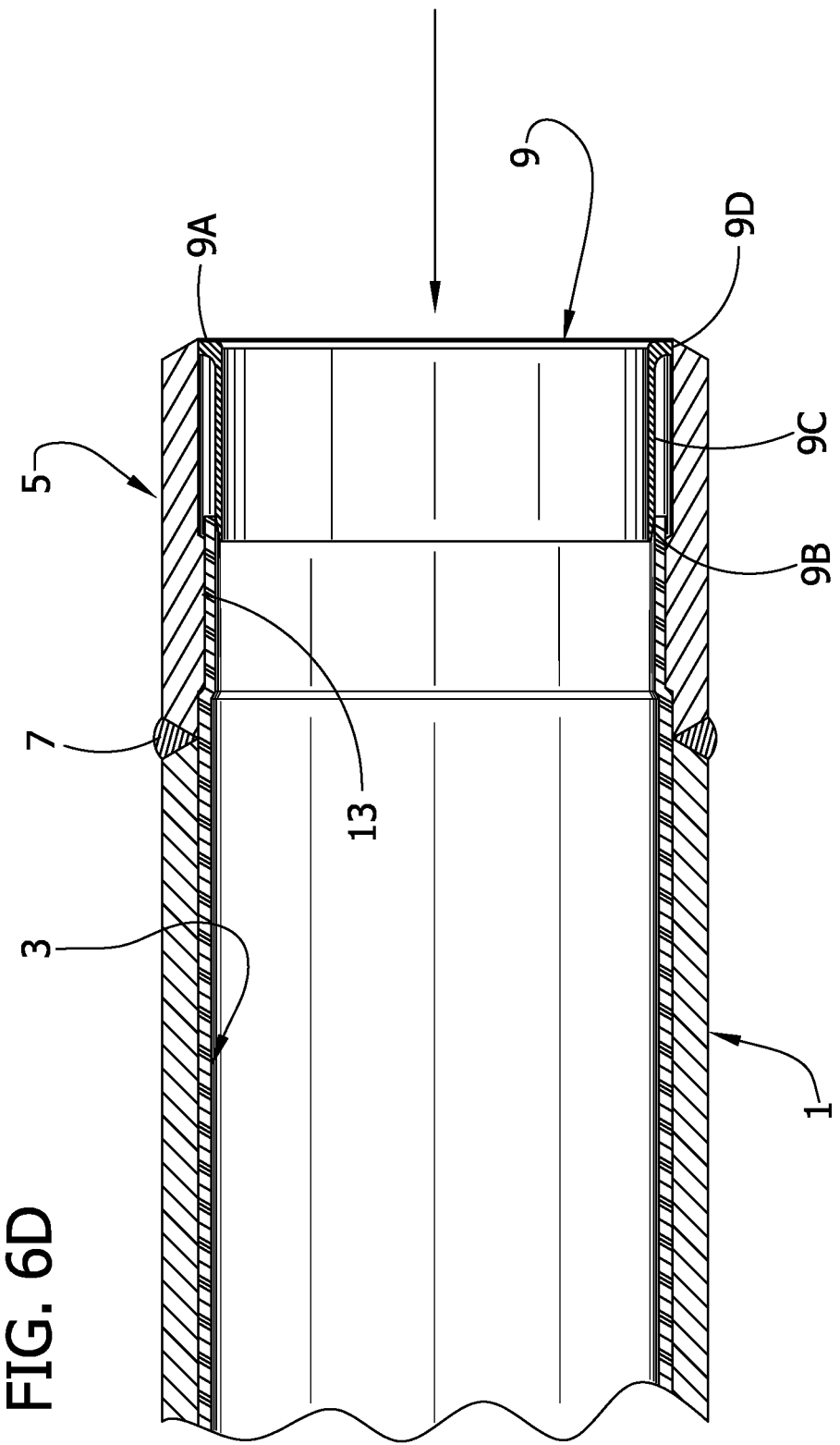

Having described the components of one embodiment of the welded joint a suitable method of installation will now be described. As shown in FIG. 6A, the process begins by welding the extension piece 5 onto the main pipe 1 forming the first annular weld 7. The main pipe 1 and extension piece 5 are then lined in a suitable manner. In one example, an HDPE liner 3 having a relaxed diameter larger than the inner diameter of the main pipe 1 (and the extension piece 5) is constricted in diameter and pulled through the main pipe and extension piece in a way known to those of ordinary skill in the art. It is noted that the liner 3 is cut back after installation to the configuration illustrated in FIG. 6B so that it extends just past the sealing shelf 13 in the extension piece 5. FIG. 6C illustrates the compression ring 9 being brought into position for insertion into the extension piece 5 in the direction indicated by the arrow. If necessary, a hydraulic jack or other suitable device (not shown) may be used to force the compression ring 9 into the extension piece 5. FIG. 6D schematically illustrated the compression ring 9 as it is being placed in the extension piece 5. The tapered end portion 9B of the compression ring 9 is just engaging the end of the liner 3 in FIG. 6D. Upon further movement of the compression ring 9 to left into the extension piece 5, the tapered portion 9B wedges the liner 3 into engagement with a central portion 9C of the compression ring and generally aligns the compression ring with the axis of the extension piece. In the illustrated embodiment, the tapered portion 9B and central portion 9C may be broadly considered as "a compression portion" of the compression ring 9. The central portion 9C moves into radial alignment with the sealing shelf 13 and tightly squeezes the liner 3, reducing its thickness, and sealing the liner against the central portion so that liquid cannot enter between the liner and compression ring. Referring back to FIG. 1, the flange 9A of the compression ring 9 moves into a position close to the sealing shelf 13 so that the terminal end of the liner 3 is wedged out (the flange is curved to facilitate this action) against the inner wall 5B of the extension piece 5 next to the sealing shelf. Moreover, the flange 9A itself also serves as a barrier to the boundary between the liner 3 and the inner wall 5A of the extension piece 5 at the end of the liner.

After the compression ring 9 is installed, the flange 9A can be welded to the inner wall 5B of the extension piece 5 by the second weld 11, sealing the compression ring with the inner wall of the extension piece. The weld 11 block ingress of fluid from the pipeline between the flange 9A of the compression ring 9 and the inner wall 5B of the extension piece so that fluid cannot reach the interface between the liner 3 and the inner wall at the terminal end of the liner by this route. At the same time, the seal between the smooth and unscarred inner diameter of the liner 3 with the central portion 9C of the compression ring 9 prevents fluid from reaching the interface of the terminal end of the liner and the inner wall of the extension piece. As previously discuss, scarring of the outer wall of the liner 3 during installation may made it difficult or impossible to obtain an adequate seal of the liner with the inner wall 5B of the extension piece 5. The sealing arrangement of the present invention employing the compression ring 9 does not require a perfect seal between the liner 3 and the inner wall 5B of the extension piece 5. The welded joint is complete and ready to be attached to another pipe, valve or the like. It will be understood that that the process of installation may include other steps. Moreover, the order of operation can be changed within the scope of the present invention. For instance, the main pipe 1 could be lined before the extension piece 5 is welded onto the main pipe.

Referring now to FIG. 7, a second embodiment of the welded pipe joint is illustrated. Except as described, the welded pipe joint is substantially the same as the welded pipe joint of the first embodiment shown in FIGS. 1-6D. Therefore, corresponding parts of the welded pipe joint will be given the same reference numeral as given in FIGS. 1-6D, plus "100". Moreover, not all parts will be separately described in the embodiment of FIG. 7, as the description can be found previously herein with respect to the embodiment of FIGS. 1-6D. The welded pipe joint includes a main pipe 101, liner 103, extension piece 105 and compression ring 109. The arrangement of these components is generally the same as before. However, the sealing shelf 13 present in the first embodiment is omitted in the second embodiment. In the second embodiment, the compression ring 109 is sized to compress the end margin of the liner 103 against an inner wall 105B of the extension piece 105 with a force sufficient to insure sealing of the end of the liner with the compression ring 9 to prevent ingress of fluid between the liner and the compression ring. The methods of forming the welded joint can be the same as described above for the first embodiment.

A third embodiment of the welded pipe joint is shown in FIGS. 8-9A. Except as described, the welded pipe joint is substantially the same as the welded pipe joint of the first embodiment shown in FIGS. 1-6D. Accordingly, corresponding parts of the welded pipe joint of FIGS. 8-9A will be given the same reference numeral as given in FIGS. 1-6D, plus "200". Not all parts of the embodiment of FIGS. 8-9A will be separately described, because they have been previously described in the first embodiment. Referring first to FIG. 8, the welded pipe joint includes a main pipe 201, liner 203, extension piece 205 and compression ring 209. A flange 209A of the compression ring 209 is attached to the inner wall 205B of the inner portion 205E of the extension piece 205 by an annular weld 211 that seals the flange with the extension piece. The extension piece 209 in the FIG. 8 embodiment is no longer made of a single material. An outer portion 205D of the extension piece 205 is made of a more inexpensive pipe material, and an inner portion 205E is made of a material that is more highly resistant to erosion, abrasion, corrosion, etc. caused by the fluid that is being transported in the pipeline. The material of the inner portion 205E may be the same material as described above for the extension piece 5. In one version, the inner portion 205E is formed by depositing metal or other suitable material on the inner diameter of the outer portion by a thermal spraying other deposition process. After the coating layer of material is formed on the inner diameter of the outer portion 205D, the layer is machined to form the desire internal diameter of the extension piece 205, and to form a sealing shelf generally indicated at 213. Other ways of forming an inner portion may be used within the scope of the present invention. The formation of the welded joint may be carried out in the ways described previously herein.

The sealing shelf 213 of the third embodiment does not have a constant diameter, but rather tapers in thickness away from the main pipe 201. Thus in one example, the maximum projection distance ($T_m$) can be about 50 to 100 thousandths of an inch (0.13 to 025 cm) at the highest point to essentially zero (see, FIG. 9A). In the illustrated embodiment, the inner portion 205E has a very small inward projection from the inner diameter of the main pipe 201 away from the sealing shelf 213. However, for purposes of the present disclosure, this distance is negligible in terms of the compression of the liner 203 that is produced. In another embodiment (not shown), the outer portion 205D of the extension piece 205 may have a slightly larger inner diameter than that of the main pipe 201, so that the inner portion 205E has an inner diameter essential the same as the inner diameter of the main pipe. In one example, where the diameter of the main pipe 201 is about 10 inches (25.4 cm) and the thickness of the liner 203 is about 0.28 inches (0.71 cm), the length (L) of the sealing shelf can be about 3 inches (7.6 cm). The tapered sealing shelf 213 provides a pinch point 214 for the liner 203 at the end of the shelf nearest the main pipe 201. One advantage of pinch point 214 of the tapered sealing shelf 213 is that cold flow of the material of the liner 203 over time will be in both directions from the pinch point along the length of the liner. That will inhibit substantial movement of liner material out from between the compression ring 209 and the sealing shelf 213 that could compromise the seal between the liner 203 and the compression ring.

When introducing elements of the ring binder mechanisms herein, the articles "a", "an", "the" and "said" are intended to mean that there are one or more of the elements. The terms "comprising", "including" and "having" and variations thereof are intended to be inclusive and mean that there may be additional elements other than the listed elements. Moreover, the use of "upward" and "downward" and variations of these terms, or the use of other directional and orientation terms, is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A welded pipeline joint of a lined pipeline comprising:
a main pipe;
an extension piece having a generally tubular shape and an inner wall;
an annular weld connecting the extension piece to the main pipe;
the extension piece having an open end opposite the main pipe, the open end having an internal diameter;
a liner extending through the main pipe and partially into the extension piece;
a compression ring including a flange and a compression portion, the compression portion engaging the liner internally and compressing the liner radially outwardly against the extension piece so that the liner is sealed with the compression portion, the flange engaging the liner and being sealed with the inner wall of the extension piece thereby to prevent ingress of fluid between the flange and the inner wall;
wherein a terminal end of the liner in engagement with the flange flares radially outward along the flange;
wherein the annular weld constitutes a first annular weld, the welded pipeline joint further comprising a second annular weld between the flange of the compression ring and the extension piece forming a seal between the flange and extension piece;
wherein the inner wall of the extension piece comprises an annular sealing shelf projecting radially inwardly and extending axially along the extension piece;
wherein the flange includes a radially outward facing surface which is in engagement with the inner wall of the extension piece; and
wherein the terminal end of the liner is in engagement with an end of the annular sealing shelf.

2. A welded pipeline joint as set forth in claim 1 wherein the compression ring further comprises a tapered portion at an end of the compression ring opposite the flange, the tapered portion tapering radially inwardly for use in wedging the liner into compression on the compression portion.

3. A welded pipeline joint as set forth in claim 1 wherein the extension piece has a minimum internal diameter defined by the annular sealing shelf, the annular sealing shelf being in engagement with the liner.

4. A welded pipeline joint as set forth in claim 1 wherein a portion of the liner extending through the main pipe has an outside diameter, and a portion of the liner in the extension piece in engagement with the annular sealing shelf has an outside diameter less than the outside diameter of said portion of the liner extending through the main pipe.

5. A welded pipeline joint as set forth in claim 1 wherein the sealing shelf tapers in radial thickness along its length.

6. A welded pipeline joint as set forth in claim 5 wherein the sealing shelf has opposite ends, each of the ends being tapered in radial thickness.

7. A welded pipeline joint as set forth in claim 1 wherein the extension piece includes a steel alloy and the compression ring includes a steel alloy.

8. A welded pipeline joint as set forth in claim 7 wherein the extension piece and compression ring are made of the same steel alloy.

9. A welded pipeline joint as set forth in claim 7 wherein the extension piece comprises an outer portion and an inner portion, the inner portion being made of the steel alloy and the outer portion being made of a different material.

* * * * *